United States Patent
Berggren et al.

(10) Patent No.: US 8,170,723 B2
(45) Date of Patent: May 1, 2012

(54) DETERMINATION AND USE OF POWER SYSTEM SENSITIVITIES

(75) Inventors: Bertil Berggren, Vasteras (SE); Mats Larsson, Baden-Dätwil (CH); Tord Bengtsson, Vasteras (SE); Petr Korba, Turgi (CH); Alexandre Oudalov, Fislisbach (CH)

(73) Assignee: ABB Research Ltd., Zurich (CH)

( * ) Notice: Subject to any disclaimer, the term of this patent is extended or adjusted under 35 U.S.C. 154(b) by 85 days.

(21) Appl. No.: 12/418,362

(22) Filed: Apr. 3, 2009

(65) Prior Publication Data

US 2010/0094477 A1    Apr. 15, 2010

Related U.S. Application Data

(63) Continuation of application No. PCT/EP2007/060412, filed on Oct. 2, 2007.

(30) Foreign Application Priority Data

Oct. 5, 2006  (EP) .................................... 06405422

(51) Int. Cl.
    *G06F 19/00*    (2011.01)
(52) U.S. Cl. ............... 700/297; 370/445; 290/2; 290/7; 307/102; 307/105
(58) Field of Classification Search .................. 700/297; 370/445; 290/2, 7; 307/102, 105
    See application file for complete search history.

(56) References Cited

U.S. PATENT DOCUMENTS 4,262,209 A * 4/1981 Berner .............................. 290/7

(Continued)

FOREIGN PATENT DOCUMENTS

EP    1 134 867 A1    9/2001

OTHER PUBLICATIONS

Xuan Wei et al., "A Common Modeling Framework of Voltage—Sourced Converters for Loadflow, Sensitivity, and Dispatch Analysis", 2003 IEEE Power Engineering Society General Meeting Conference Proceedings, Toronto, Ontario, Canada, Jul. 13-17, 2003, IEEE Power Engineering Society, New York, NY: IEEE, US, vol. 4 of 4, Jul. 13, 2003, pp. 2569-2575.

(Continued)

*Primary Examiner* — Kakali Chaki
*Assistant Examiner* — Tejal Gami
(74) *Attorney, Agent, or Firm* — Buchanan Ingersoll & Rooney PC

(57) ABSTRACT

The present disclosure relates to power system sensitivities as computed from power flow parameters and control parameters of a Power Flow Control Device (PFC). To this end, control parameter variations are applied to or generated by a PFC, and comprise variations in a control input u, a control effort e (injected series voltage, inserted series reactance), or a control effect q (power flow, active power transfer, phase-shift, current). A power flow response measuring unit measures a variation of a power flow response such as current, active or apparent power, in a way sufficiently synchronized with the control parameter variation to allow establishing an unambiguous causal relationship or correspondence in the form of a power system sensitivity. The latter may be on-line adapted to continuously reflect an updated aspect of the power system behavior, and thus enable an improved, fast and reliable power flow control in power systems comprising a meshed power network with two parallel flow paths or corridors connecting two areas or sub-systems.

13 Claims, 2 Drawing Sheets

U.S. PATENT DOCUMENTS

2001/0021896 A1    9/2001   Bertsch et al.
2005/0058151 A1*   3/2005   Yeh .............................. 370/445

OTHER PUBLICATIONS

A. Armbruster et al., "The Maximum Flow Algorithm Applied to the Placement and Distributed Steady—State Control of UPFCs", Power Symposium, 2005, Proceedings of the 37th annual North american AMES, IA, USA, Oct. 23-25, 2005, Piscataway, NJ, USA, IEEE Oct. 23, 2005, pp. 77-83.

M. Larsson et al., "Improvement of Cross-border Trading Capabilities through Wide-Area Control of FACTS", Proceedings of Bulk Power System Dynamics and Control VI, Aug. 22-27, Cortina D'Ampezzo, Italy, 2004, pp. 80-87.

International Search Report (PCT/ISA/210) dated Jan. 15, 2008.
Written Opinion of the International Searching Authority (PCT/ISA/237) dated Jan. 15, 2008.
International Preliminary Report on Patentability (PCT/IPEA/409) dated Oct. 31, 2008.
European Search Report (EPO Form 1507N) dated Feb. 27, 2007.

* cited by examiner

DETERMINATION AND USE OF POWER SYSTEM SENSITIVITIES

RELATED APPLICATIONS

This application claims priority under 35 U.S.C. §119 to EP Application 06405422.4 filed in Europe on Oct. 5, 2006, and as a continuation application under 35 U.S.C. §120 to PCT/EP2007/060412 filed as an International Application on Oct. 2, 2007 designating the U.S., the entire contents of which are hereby incorporated by reference in their entireties.

TECHNICAL FIELD

The disclosure relates to the field of power flow control in electric power systems comprising a plurality of power transmission corridors interconnecting distinct areas.

BACKGROUND INFORMATION

In the wake of the ongoing deregulations of the electric power markets, load transmission and wheeling of power from distant generators to local consumers has become common practice. As a consequence of the competition between utilities and the emerging need to optimize assets, substantially increased amounts of power are transmitted through the existing networks, occasionally causing congestion, transmission bottlenecks and/or oscillations of parts of the power transmission systems. In this regard, electrical transmission networks are highly dynamic, and in response to changing network states, loads or power injected by generating units, the power flow over alternate transmission paths may need to be redistributed.

Therefore, a network based control for a redirection and a uniform redistribution of power flows in the transmission system without generation rescheduling or topological changes becomes a very important instrument in the hands of independent Transmission System Operators (TSO). Changes are made according to the current topology and electrical flow situation of the electrical transmission network, e.g., by means of network controllers or Power Flow Control Devices (PFC) that are used to control the bus voltages, line currents or phase angles and that are designed to supply reactive power to support voltage and provide stability enhancements. These devices are installed at transmission line stations to adjust power flow in each transmission line, so that power can be guided to flow in a safe, stable and balanced manner in a large number of lines within the electrical transmission network.

PFCs such as a Phase Shifting Transformer (PST), a Flexible Alternating Current Transmission Systems (FACTS) device or a High Voltage Direct Current (HVDC) device improve dynamic performance of electrical transmission networks. Examples of FACTS devices that can perform power flow control are the Unified Power Flow Controller (UPFC), the Static Synchronous Series Compensator (SSSC), the Thyristor Controlled Series Compensator (TCSC) and the Thyristor Switched Series Compensator (TSSC). PFCs are controlled via control or operational parameters, resulting in either discrete (e.g. PST and TSSC) or continuous responses from the PFC devices depending on their nature.

The conventional practice is to change the control or operational parameters of the PFCs in a rather static way, and/or use a closed loop control based on local measurements performed in the substation where the PFC device is installed. For example, in the case of a PST the position of the tap changer is computed based on global loss minimization or optimal power flow calculations taking transfer limits of various components into account, and the position manually set by an operator and typically updated on a time-scale of hours. This way transfer limits also on other paths than those under direct control can be taken into account. Typical operation practices imply that the PFCs are set such that transfer limits are satisfied without additional power flow control effort also if any one network component is disconnected due to fault. This security constraint, which often is referred to as the N−1 security constraint, constitutes a trade off between efficient operation of the transmission network and the security of the network in case of disturbances. Thus in the time period prior to a disturbance the network is operated less efficiently due to the security constraint. Furthermore, in the event of more severe disturbances, i.e. disturbances not included in the security constraint, the response is slow since there is an operator in the loop and the state snapshots, which often are obtained through a SCADA system and state estimation, may not be updated reliably or rapidly enough to make sure transfer limits are complied with. In turn, this may lead to cascaded line tripping as overloaded lines are disconnected by local protection, if the combined response time of the SCADA/EMS system and the operators is too long.

Fast network controllers or Power Flow Control Devices (PFC) which are based on power electronic semiconductor components and which do not rely on mechanical switches for their main functionality, enable response times in the millisecond range. They include, among others, the aforementioned Flexible Alternating Current Transmission System (FACTS) devices as well as High Voltage DC (HVDC) devices. HVDC devices comprise line commutated converters or voltage source converters for rectifying AC active power to DC power and inverting DC power back to AC active power, which converters are based on a multitude of semiconductor components or modules that are individually controlled by control signals produced by gate drives or other control hardware of a converter controller.

By way of example, the primary controllers that are embedded in FACTS devices are typically of P- or PI-type, with occasional supplementary controllers like damping controllers. Normally, the set-points for FACTS devices are kept constant or changed manually on a slow time scale based on market activities or optimal power-flow calculations. Typical FACTS device controllers operate purely based on rather simple local objectives such as keeping constant, or as close as possible to a specified reference value, the power flow on a certain line or the voltage in one point in the network, or improving a transfer capability of transmission corridors.

With such a fast but local control, a controlled path can be protected from overloads since flows can be diverted by the PFC, however, the effects on other parts of the network are not taken into account. In disturbance cases, local control on certain paths can contribute to overload and tripping of other circuits with cascaded line tripping as a result. For this reason, power flow control can have a detrimental effect on the overall system stability, and power utilities are therefore cautious when equipping PFC with automatic control.

A state or condition of an electric power system at one specific point in time can be obtained from a plurality of synchronized phasor measurements or snapshots collected across the electric power system or power transmission network. Phasors are time-stamped, complex values such as amplitude and phase, of local electric quantities such as currents, voltages and load flows, and can be provided by means of stand-alone Phasor Measurement Units (PMU). These units involve a very accurate global time reference, obtained e.g. by using the Global Positioning Satellite (GPS) system or any other comparable means, and allowing synchronization of the time-stamped values from different locations. The phasors are sampled at a rate of 20 to 60 Hz, and thus can provide a view on transient or sub-transient states that goes beyond the rather static view as provided by SCADA/EMS. Conventionally, PMUs forward their measured phasor values to a system protection centre at control level or alternatively to a PMU acting as a master. Data exchange can further be established between the system protection centre and other control and protection systems to allow for optimal data sharing and control actions based on oscillation detection and frequency deviations.

EP1134867 discloses a method that assesses the stability of an electric power transmission network. It comprises measuring voltages and currents at a plurality of locations of the network, transmitting the latter as well as information regarding the state of switches of at least one substation to the system protection centre, and generating at least one stability margin value of the transmission network there from. In this way, detailed real-time information about the state of the network is collected at a system level of the network, allowing a corresponding global analysis of the information.

Due to the physical laws governing the flows in the power transmission network or electricity grid, the power flows distribute according to a "law of least resistance". A consequence of this is that not all components in the network reach their limits (which may be thermal overload, or limits based on other considerations such as voltage or transient stability) simultaneously. Therefore, increased utilization of the grid can be allowed if flows are diverted from lines that are overloaded onto lines with higher thermal margins or stability limits.

In the article by M. Larsson et al. "Improvement of Cross-border Trading Capabilities through Wide-area Control of FACTS", Proceedings of Bulk Power System Dynamics and Control VI, 22-27 August, Cortina D'Ampezzo, Italy, 2004, coordination of a multitude of FACTS devices is proposed. A secondary control loop generates the set-points for the primary FACTS controllers, based on global or wide-area information. The latter comprises state snapshots from a wide-area measurement system including a relatively large number of Phasor Measurement Units (PMUs). The subsequent mathematical optimization of the FACTS set-points occurs in real time with respect to e.g. an avoidance of overloading corridors, controlling power flows to a predefined reference, voltage security assessments and/or accurate stability margins. The design of a secondary, wide-area controller logic relies on a detailed inspection of the network topology and a prioritization of various control objectives. A computationally expensive optimization procedure based on information related to topology and system state has to be executed at least at each update of the underlying information.

SUMMARY

Exemplary embodiments disclosed herein can enable an improved, fast and reliable power flow control in power systems comprising a meshed power network with two parallel flow paths or corridors connecting two areas or sub-systems.

A method of determining a power flow control connection for a meshed power network with two parallel flow paths and a first Power Flow Control Device (PFC) arranged to control, based on at least one of a first control parameter $u_1$, $e_1$, and $q_1$, a power flow $f_1$ in a first one of the two parallel flow paths, comprising determining a variation $\Delta u_1$, $\Delta e_1$, $\Delta q_1$ of the first control parameter in the first one of the two parallel flow paths, determining, in a manner timely synchronized with the determination of the variation $\Delta u_1$, $\Delta e_1$, $\Delta q_1$ of the first control parameter, a variation $\Delta f_i$ of a power flow response $f_i$ in a second one of the two parallel flow paths, and calculating a power system sensitivity $s_{i,1}$ based on the variation $\Delta u_1$, $\Delta e_1$, $\Delta q_1$ of the first control parameter and the time-synchronized variation $\Delta f_i$ of the power flow response and utilising the power system sensitivity to determine the power control correction.

BRIEF DESCRIPTION OF THE DRAWINGS

The subject matter of the disclosure will be explained in more detail in the following text with reference to exemplary embodiments which are illustrated in the attached drawings, in which.

The reference symbols used in the drawings, and their meanings, are listed in summary form in the list of reference symbols. In principle, identical parts are provided with the same reference symbols in the figures.

DETAILED DESCRIPTION

Figure 1:
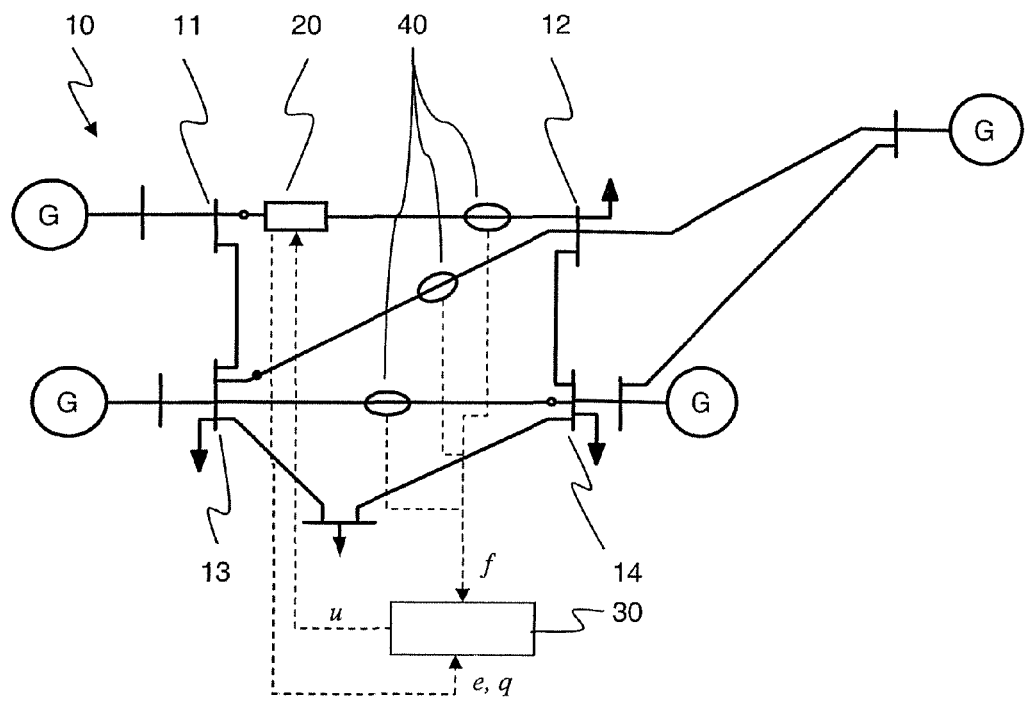
FIG. 1 shows a meshed power network with a Power Flow Control Device (PFC)

According to the disclosure, power system sensitivities or normalized power flow responses relate a power flow response of a particular flow path to a control parameter of a Power Flow Control Device (PFC) in a different flow path. To this end, variations in a control parameter and variations in a power flow response responsive to the variation in said control parameter are determined in a way sufficiently synchronized and/or correlated to allow establishing an unambiguous causal relationship in the form of a power system sensitivity. Power system sensitivities may be updated in real time with limited computational effort, and may subsequently be used for controlling or redistributing power flow in a meshed power network with at least two parallel power flow or transfer paths.

The power flow response may be an actual active or apparent power flow or a current measured by a suitable power flow response measuring unit or sensor. However, according to a first exemplary embodiment of the disclosure, the power flow response may be a derived or diagnostic quantity such as line conductor temperature or line sag, dependent on the actual power flow in the respective particular line.

In a second exemplary embodiment, the control parameter of the PFC is a local or internal control quantity of the PFC, of which any momentary or instantaneous value does relate to a momentary value of the power flow response, and which is responsive to, but distinct from, a global or external control input to the PFC as specified by a human operator or a hierarchically superior controller. Possible PFC-inherent time delays between a change in such a control input and the related change in the power flow response need thus not be considered or compensated for.

In particular, said local or internal control quantity of the PFC may be a control effort or control output, i.e. a local controlling quantity such as injected series voltage, inserted series reactance, transmitted power or tap position, directly set or defined by the control input. On the other hand, if the PFC is equipped with a local or primary controller having the control input as a set-point or reference, the local or internal control quantity of the PFC may be a control effect of the PFC, i.e. a local controlled quantity such as power flow, active power transfer, phase-shift across a PST or current measured at or in the vicinity of the PFC. This control effect obviously is being affected by the control effort and may be used, according to a third exemplary embodiment of the disclosure, as a feedback quantity for the controller. In this case, a control effect measuring unit provided for measuring the feedback quantity may at the same time determine the variations in the control effect for the purpose of the power system sensitivities.

In an exemplary embodiment, variations in the control quantity of the PFC are deliberately induced in order to probe the power flow response by generating, by a system control unit, variations in a control input, and by applying the latter to the PFC. On the other hand, variations in the control quantity may be generated as part of regular corrective actions initiated by a PFC and responsive to a change of power system state or topology, or triggered by a schedule. These latter variations, occurring without change in the control input, may likewise be evaluated, together with corresponding variations in power flow responses, for calculating the power system sensitivities.

In a further exemplary embodiment, the sensitivities are calculated not just as a ratio of the two related variations approximating a derivative, but by reverting to sophisticated parameter estimation or correlation analysis techniques.

In a still further advantageous variant of the disclosure, a power flow response is measured at a plurality of locations remote from the location of the PFC and for flow paths other than the one controlled by the PFC. In order to satisfy the synchronization requirements, advantage is taken of synchronized time stamps provided by Phasor Measurement Units (PMUs), even if the actual power flow response is a Root Mean Square (RMS) value and not a phasor.

Compared to SCADA based optimization procedures, power flow control based on power system sensitivities according to the disclosure, in particular if the latter are on-line adapted to continuously reflect an updated aspect of the power system behaviour, is more accurate and demands less processing power. This in turn allows for a more efficient use of the power network prior to a disturbance, alleviating congestions due to thermal limitations, and a fast and accurate response also to more severe disturbances not in the "N–1 contingency list". Accordingly, the sensitivities can be adapted or updated either periodically with a fixed sampling time ranging from a few seconds to a few minutes, or after a change in a topology of the power system is detected, or after a PFC control parameter variation has been effected to modify the flow on one of the controlled paths, or any combination of the mentioned methods. Compared to the conventional practice, the proposed active and automatic control strategy that can optimize power flows during each hour of the day makes a better use of the potential that offer the costly PFCs.

FIG. 1 shows a meshed power network 10 with a plurality of parallel flow paths or power transmission corridors. In the following, the term "parallel flow paths" refers to any two flow paths that interconnect two nodes or areas 11, 12, 13, 14 in the network 10. By way of example, in FIG. 1 the nodes 11 and 12 are connected by parallel flow paths 11-12, 11-13-12, and 11-13-14-12. The power network is an AC network with a plurality of power sources G and loads (depicted as arrows) interconnected in a meshed configuration. A Power Flow Control Device (PFC) 20 is arranged to control the flow of electric power in flow path 11-12, but will also affect the flow through the aforementioned alternative parallel flow paths between the nodes 11 and 12.

There are a number of different types of PFCs available to control the power flow in the sense of the present disclosure, wherein the different types of PFCs control the flow in distinct ways via distinct control efforts. By way of example, a PFC operates by injecting a series voltage (e.g. PST, UPFC and SSSC), by inserting series reactance elements (e.g. TCSC and TSSC) or by directly controlling the transmitted power (e.g. HVDC). As a result, the power and/or current distribution between the line in which the PFC is installed and parallel flow paths can be controlled within the limits set by the ratings of the PFC.

The abovementioned control effort e (i.e. injected series voltage, inserted series reactance or transmitted power), or the value of a respective control input u applied to the PFC, can be determined as part of the day-ahead off-line planning process, with a temporal resolution on a time scale of hours. The control input can be the set-point to an internal feedback controller of the PFC, or, in case such a controller is either absent or very fast, an explicit setting of the device or its control effort, respectively. Any control input variation $\Delta u$ results in a variation of the control effort $\Delta e$ of the PFC device, and eventually in a variation of power flow responses $\Delta f_i$ all over the network. A system control unit 30 is arranged to calculate and feed the values of the control input to the PFC 20. The system control unit 30 may be integrated in a PFC 20 or provided as one or more separate modules, or be implemented as a software function in a network control system. If additional PFCs are arranged in the meshed network 10 in order to gain increased control of the power flow, the system control unit 30 may coordinate, e.g., all the PFCs.

One or more power flow response measuring units 40 are provided, e.g., on the lines 11-12, 12-13 and 13-14 that are, for the purpose of the present example, assumed "critical" from a thermal point of view and present a risk of being overloaded in case of a disturbance. Examples of power flow responses are current I, active power P and apparent power S. Likewise, diagnostic quantities that are dependent on the power flow, such as line sag or line conductor temperature, may be measured by appropriate measuring units or sensors 40 and evaluated by the system. The specific choice of a power flow response for the following steps depends on the characteristics of the network, as there are several possible causes behind limitations in flow of electric power through a power line. One example of a limiting factor is a thermal overload which is directly related to the current I. Correspondingly, whilst it is assumed that as long as the operation is according to plan no thermal constraints are violated, following a disturbance, one or more of the lines and/or transformers may be thermally overloaded.

Figure 2:
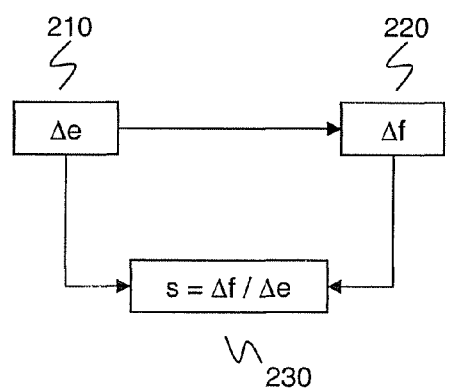
FIG. 2 depicts a flowchart of a method of determining power system sensitivities.

FIG. 2 depicts a structure or flow chart of a method of determining power system sensitivities according to the disclosure, comprising, in steps 210: artificially perturbing the control effort e of the PFC 20 as an exemplary first control parameter by e.g. letting the system control unit 30 modulate the control input u in order to induce changes in power flow responses f as variations in the current or flow of electric power, 220: retrieving, to the system control unit 30, time synchronized values of variations in control effort $\Delta e$ obtained from the local control system of the PFC and time synchronized values of variations $\Delta f$ in the power flow responses measured by power flow response measuring units 40, and 230: determining, for each flow path where a power flow response variation $\Delta f$ has been registered, the power flow sensitivity or normalized power flow response s from the time synchronized power flow response variation Δf and the associated control effort variation Δe, e.g., as a ratio Δf/Δe.

The mutual sensitivities in an exemplary embodiment with m power flow responses and n control parameters can be written in matrix form yielding the sensitivity matrix $$S = \begin{bmatrix} \Delta f_1/\Delta e_1 & \cdots & \Delta f_1/\Delta e_n \\ \vdots & \ddots & \vdots \\ \Delta f_m/\Delta e_1 & \cdots & \Delta f_m/\Delta e_n \end{bmatrix}$$

Instead of a simple ratio Δf/Δe, more sophisticated techniques including e.g. least squares techniques or other standard system identification methods for identifying correlations between power flow changes and control parameter changes, and incorporating a noise term n in the underlying model of the form $$\Delta f = S(s) * \Delta u + n,$$

may be used. Here, the sensitivity matrix S(s) is a gain matrix, or, if the dynamics of a local or internal controller of the PFC is to be included as well, a matrix of transfer functions corresponding to a differential or difference equation. The latter is particularly appropriate if the control input u is used as a control parameter and if the internal controller is slow and/or involves mechanical actuators as in the case of a PST. In case of unknown disturbances (e.g. line trips) affecting the control quantities and power flow responses, the model above obviously has to be extended by an additional term involving Δe or Δq.

As the flow of electric power in the flow paths in a meshed power network is highly dynamic, the control effort variation must be large enough so that the corresponding flow parameter response is significant with respect to other variations in flow. The control effort variation can be in the form of discrete steps or a continuous variation. In particular at disturbed conditions, quite a number of uncoordinated corrective actions may be activated, which makes the time stamping of measurements valuable since it provides for the possibility of an exploitable match between change in control effort and flow parameter response.

The step 220 of time-synchronized registration of at least one power flow response can be made in any suitable way, such as by existing measuring units in the network or by specially adapted measuring units 40. Non-limiting examples are e.g. voltage transformers, current transformers, binary signals from relays, active and reactive power transducers, generator speed transducers and temperature transducers. More specific transducers, such as Phasor Measurement Units (PMUs) which are in some cases already installed as part of wide-area monitoring systems can also be used.

Any change in the topology of the power system or the loss of a network element on a path parallel to the PFC (disconnection of a line) due to a disturbance will probably affect the sensitivities. Further, and as indicated above, any change in the topology of the power system or the loss of a network element on a path parallel to the PFC may result in a change in control effort and/or effect in order to satisfy a local feedback loop although the local set point corresponding to the control parameter u is unchanged. Hence, the sensitivities are up-dated at least once per control cycle, and, e.g., following, and even exploiting the changes in control efforts and/or effects that are part of the intended corrective action. Alternatively, the method of determining the sensitivities may be performed repeatedly according to a fixed schedule, e.g. once every second.

The accuracy of the sensitivities determined by the present disclosure depends to a large extent on the accuracy of the time synchronization of the registration of the variation of the control parameter and the variation in the power flow response. Hence any local control system of the PFC 20 is equipped with a time synchronization registration such that a change in control effort or control effect may be time stamped. Due to the large distances between the flow paths in a meshed power network, the time synchronization puts high demands on the synchronization and communication between the measuring units 40, the PFCs and the system control unit 30, and therefore favours the use of the GPS-based time synchronization provided by PMUs.

Figure 3:
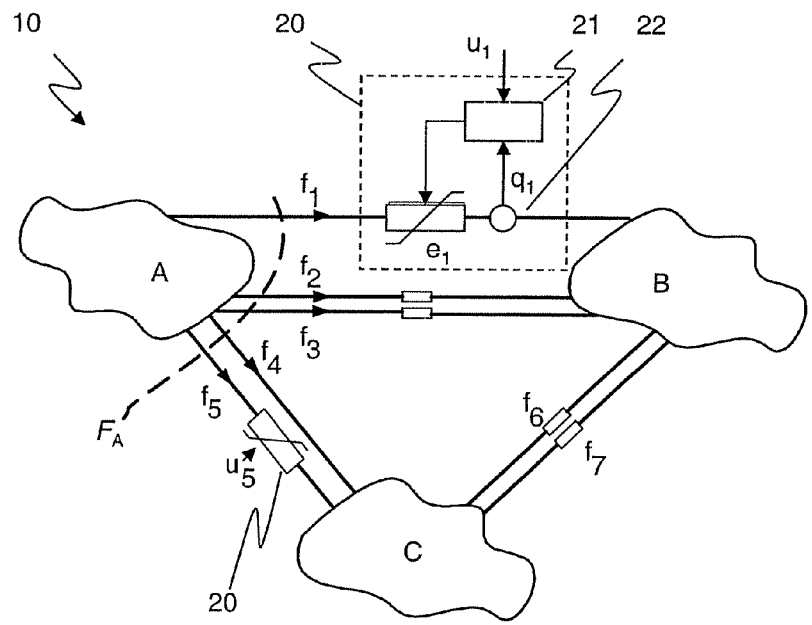
FIG. 3 shows a further meshed power network.

FIG. 3 shows a further meshed power network 10 comprising three areas A, B, C each connected by two or more parallel power transfer corridors or flow paths of which individual sections are identified by the indices 1 to 7. In the following, area A is considered specifically, a transfer cut depicted by the dashed line in FIG. 3 grouping the flow paths 1 to 5 through which a total power flow $F_A$ into or out of area A takes place. Physically, these transfer paths could be individual power lines or circuits on a multi-circuit power line. On the other hand, the areas need not necessarily be geographically distant regions, but may geographically overlap and distinguish exclusively in network frequency and voltage level.

For selected paths (index i) a power flow response $f_i$ reflecting an operating state of the path is determined and a limit value $c_i$ in terms of that power flow response is specified. As mentioned, said power flow response may be an active power flow or an RMS current, with corresponding maximum allowed operational values, but could also be for example a conductor temperature estimate, a voltage measurement, or a maximum line sag, which are dependent on the power flow on the respective line and which are assignable corresponding predefined limits. Among these selected paths, power flow paths 1 and 5 are controlled paths (index j) each equipped with a PFC 20 and associated with a control input $u_j$ corresponding preferentially to an active power flow. As depicted in FIG. 3 for power flow path 1, this control input $u_1$ acts as a set-point or reference of a local or primary controller 21 which is e.g. based on closed loop flow control and which influences a control effort $e_1$ of the PFC. A control effect $q_1$ of the PFC, i.e. a local controlled quantity such as power flow, active power transfer or current measured by a control effect measuring unit 22 at or in the vicinity of the PFC, is used as a feedback quantity for the controller 21.

The problem is to set the control input $u_j$ in such a way that:
  interactions of multiple PFCs are minimized,
  transfer limits are not violated, that is, $f_i < c_i$ is respected for all selected paths,
  the value $u_j$ of the control input of each PFC is set as close as possible to a reference schedule $R_j$, wherein the reference schedule $R_j$ for each device can be given a-priori, set manually by an operator or computed from measurements of the power flow responses $f_i$ on one or more of the paths.

A use of the power system sensitivities according to the disclosure is thus directed to an automatic secondary control scheme to be employed in addition to the local or primary controllers described above. The control inputs $u_j$ are adapted to make sure the different PFCs cooperate to optimize the transfer pattern on the whole grid and not only each controlled power flow path individually. In FIG. 3, this would for instance require a system control unit to be connected to both PFC controllers 20.

Figure 4:
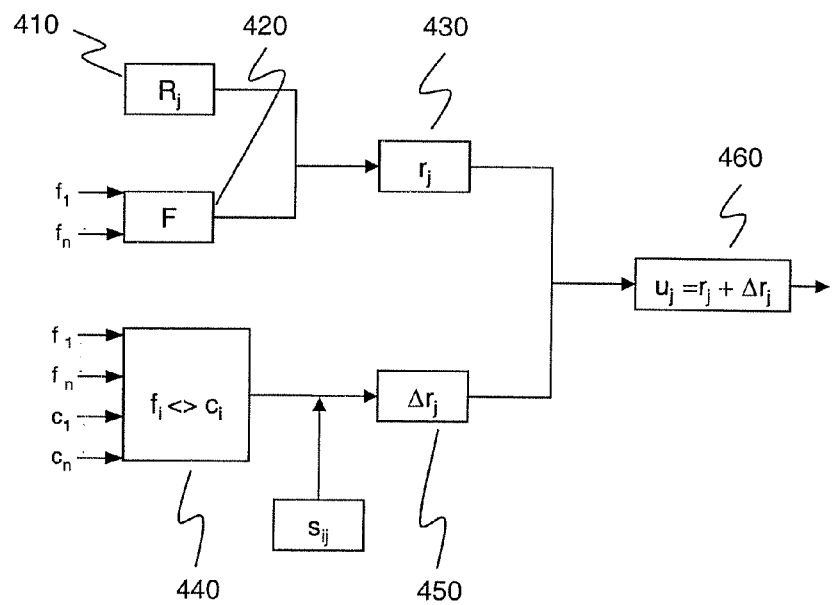
FIG. 4 depicts a flowchart of a method of controlling a power flow in a power system.

FIG. 4. depicts the structure of a secondary control scheme, i.e. the details of the system control unit 30, comprising, in steps 410: Determining a reference schedule $R_j$, e.g., off-line through an optimal power flow study or set by an operator e.g. in terms of the percentage of the total flow through the transfer cut that is desired through each path. In the normal state, as long as no constraint violations are present, the controller selects the set-points based on this reference schedule, 420: Measuring the total power flow F through a transfer cut using time-synchronised measurements as a function of the power flow on each path through the transfer cut, 430: Computing a nominal set-point $r_j$ for each controlled device based on the measurement of the total flow F and the pre-defined schedule $R_j$, 440: Measuring a power flow response $f_i$ such as an actual flow or a line temperature on each controlled or uncontrolled path participating in the secondary control schemes, and providing a measure of the tolerable power flow response, i.e. a limit value $c_i$, for each path. A limit is determined for example by the thermal capability of a particular line, in terms of current, active apparent power flow, or any other factor dependent thereof such as conductor temperature or maximum line span sag. Generally, limits $c_i$ are established during planning of the power system, and may actually vary during a day or a week according to a predefined schedule. The power flow response and its limit are used to detect an overload situation or pattern by comparison.

450: A correction term or correction factor $\Delta r_j$ for each PFC controller set-point is computed based on the identified overload pattern from the previous stage and involving the sensitivities $s_{i,j}$. If the latter have not been defined w.r.t. the control input u, a mapping back from the control quantities e, q to the control input u may be required in this step. The procedure may follow an inverse order, starting off from an identified excess power flow response that one intends to relief, or may involve a tentative prediction of a multitude of power flow situations and a subsequent selection of the preferred control input settings. Hence, in order to avoid corrections of power flow responses that, in an overload situation, actually worsen the load situation in the meshed power network, an on-line prediction of the resulting flow situation may be invoked before any correction of the PFC control efforts is actually executed. To account for device limitations, internal signals from each PFC may need to be fed back into the set-point correction stage.

460: The actual set-points $u_j$ are computed as a function of the nominal set-points $r_i$ computed in step 430 and the correction term $\Delta r_j$ computed in step 450. These set-points are then applied to the local PFC controllers as $u_j = r_j + \Delta r_j$.

In one exemplary embodiment, the coordinating system control unit 30 addresses the local controllers 21 serially, i.e. one after the other, and reserves time slots following a change of the value of the respective control input $u_j$. This prevents a plurality of local controllers acting at the same time which would make it hard to distinguish each controller's contribution to a change in the power flow responses.

The correction of the power flow response may be performed in one step or by a number of smaller steps depending on the type of PFC used. As an example, a PST with a tap-changer will essentially take one step every 5 seconds, whereas a power electronic device can make the whole change in one step if desired. In order to avoid large fluctuations in the power network it may however be suitable to make stepwise changes in the identified direction even when using a PFC that can make a full change in one step. Moreover a stepwise change permits determination of updated power flow responses for each step and thus updated predictions of the preferred change in control input. Specifically, when addressing thermal limits, there is no excessive need for speed of control. Instead it may be suitable to have a fairly slow change in PFC flow in order not to disturb the system more than necessary. Thus, even if an estimate of the final set-point is obtained immediately after a disturbance, this estimate will be updated a number of times during progress towards the final operating point.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

| LIST OF DESIGNATIONS | |
|---|---|
| 10 | meshed power network |
| 11, 12, 13, 14 | node |
| 20 | Power Flow Control Device (PFC) |
| 21 | local PFC controller |
| 22 | control effect measuring unit |
| 30 | system control unit |
| 40 | power flow response measuring unit |

What is claimed is:

1. A method of determining a power flow control correction for a meshed power network with two parallel flow paths and a first Power Flow Control Device (PFC) arranged to control, based on at least one of a first control parameter $u_1$, $e_1$, and $q_1$, a power flow $f_1$ in a first one of the two parallel flow paths, comprising:

determining a variation $\Delta u_1$, $\Delta e_1$, $\Delta q_1$ of the first control parameter in the first one of the two parallel flow paths;

determining, in a manner timely synchronized with the determination of the variation $\Delta u_1$, $\Delta e_1$, $\Delta q_1$ of the first control parameter, a variation $\Delta f_i$ of a power flow response $f_i$ in a second one of the two parallel flow paths;

calculating a power system sensitivity $s_{i,1}$ based on the variation $\Delta u_1$, $\Delta e_1$, $\Delta q_1$ of the first control parameter and the time-synchronized variation $\Delta f_i$ of the power flow response in the second one of the two parallel flow paths, wherein the power system sensitivity $s_{i,1}$ is calculated by means of a parameter estimation or correlation analysis technique, and wherein $s_{i,1}$ is initially calculated as at least one of $\Delta f_i/\Delta e_1$, $\Delta f_i/\Delta u_1$, $\Delta f_i/\Delta q_1$; and utilising the power system sensitivity to determine the power control correction of the power flow in the first one of the two parallel flow paths.

2. The method according to claim 1, comprising:

determining a variation $\Delta f_i$ of a power flow response $f_i$ which is a derived quantity dependent on an actual power flow in the second one of the two parallel flow paths of the meshed power network.

3. The method according to claim 1, comprising:

determining a variation of the first control parameter as a variation $\Delta e_1$, $\Delta q_1$ of a control quantity of the PFC which is instantaneously correlated to the power flow response.

4. The method according to claim 3, comprising:
determining a variation of the control quantity of the PFC which is a variation $\Delta q_j$ of the control effect, wherein the control effect $q_1$ a local feedback quality.

5. The method according to claim 3, comprising:
determining a variation $\Delta e_1$, $\Delta q_1$ of the control quantity which is generated by the first PFC in response to a control input variation $\Delta u_1$ fed to the PFC.

6. The method according to claim 2, comprising:
determining a variation $\Delta e_1$, $\Delta q_1$ of the control quantity which is generated by the first PFC in response to a variation of the power flow $f_1$ in the first one of the two parallel flow paths.

7. The method according to claim 1, comprising:
determining time synchronized power flow response variations $\Delta f_i$ in a plurality of locations remote from the PFC.

8. The method according to claim 6, comprising:
determining the time synchronized power flow response variation $\Delta f_i$ by means of Phasor Measurement Units (PMU).

9. A use of a power system sensitivity $s_{i,1}$ calculated according to claim 1 for controlling power flow in a meshed power system comprising two areas interconnected by a first transfer path controlled by a first PFC and a second transfer path in parallel to the first transfer path, comprising:
calculating a correction $\Delta r_1$ to a nominal set-point $r_1$ of a local controller of the first PFC based on the power system sensitivity $s_{i,1}$ and an intended change $\Delta f_i$ based on the power system sensitivity $s_{i,1}$ and a change $\Delta f_i$ of a power flow response $f_i$ in the second transfer path, the change $\Delta fi$ configured to overcome an identified overload pattern; and
applying a corrected set-point $u_1$ as a control input to the local controller of the first PFC (20) as $u_1=r_1+\Delta r_1$.

10. The use according to claim 9, comprising:
specifying a limit value $c_i$ to the power flow response $f_i$ in the second transfer path,
measuring a power flow response $f_i$ in the second path,
detecting an overload situation in the second path by comparing the limit value $c_i$ to the measured power flow response $f_i$, and
calculating the correction $\Delta r_1$ in order to relief the overload situation in the second path.

11. The use according to claim 9, comprising:
applying a plurality of the corrected set-point $u_1$ as a control input to a plurality of the local controller of a plurality of PFCs in a serial manner.

12. The method according to claim 5, comprising:
determining time synchronized power flow response variations $\Delta f_i$ in a plurality of locations remote from the PFC.

13. A use of a power system sensitivity $s_{i,1}$ calculated according to claim 8 for controlling power flow in a meshed power system comprising two areas interconnected by a first transfer path controlled by a first PFC and a second transfer path in parallel to the first transfer path, comprising
calculating a correction $\Delta r_1$ to a nominal set-point $r_1$ of a local controller of the first PFC based on the power system sensitivity $s_o$ and an intended change $\Delta f_i$ of a power flow response $f_i$ in the second transfer path given an identified overload pattern, and
applying a corrected set-point $u_1$ as a control input to the local controller of the first PFC as $u_1=r_1+\Delta r_1$.

* * * * *